United States Patent [19]
Dyer et al.

[11] 3,919,137
[45] Nov. 11, 1975

[54] PROCESS FOR MAKING POLYVINYL CHLORIDE PROCESSING AID INVOLVING COOLING STEP IN ACRYLATE GRAFT POLYMERIZATION OF POLYVINYL CHLORIDE

[75] Inventors: James N. Dyer, New City, N.Y.; Arthur J. Yu, Stamford, Conn.

[73] Assignee: Stauffer Chemical Company, Westport, Conn.

[22] Filed: May 21, 1973

[21] Appl. No.: 362,159

[52] U.S. Cl. ...... 260/17 A; 260/92.8 W; 260/80 M; 260/17.4 GC
[51] Int. Cl.² ............... C08F 114/02; C08F 114/16
[58] Field of Search ......... 260/884, 17.4 GC, 17 A, 260/92.8 W

[56] References Cited
UNITED STATES PATENTS

| | | | |
|---|---|---|---|
| 2,746,944 | 5/1956 | Naps et al. | 260/884 |
| 2,875,186 | 2/1959 | Gerhard et al. | 260/17 A |
| 3,293,199 | 12/1966 | Abercrombie et al. | 260/17 A |
| 3,504,053 | 3/1970 | Williams | 260/884 |
| 3,772,226 | 11/1973 | Powell et al. | 260/17 A |

FOREIGN PATENTS OR APPLICATIONS

| | | |
|---|---|---|
| 1,015,334 | 12/1965 | United Kingdom |
| 1,062,308 | 3/1967 | United Kingdom |

Primary Examiner—Melvin Goldstein
Assistant Examiner—Peter F. Kulkosky
Attorney, Agent, or Firm—Paul J. Juettner

[57] ABSTRACT

A process is disclosed for preparing a polyacrylate-modified polyvinyl chloride processing aid for polyvinyl chloride by sequentially polymerizing the vinyl chloride and the desired acrylate ester monomer. Thus, a conventional vinyl chloride suspension polymerization is conducted at a controlled rate of agitation and in the presence of a specified concentration of an alkyl, hydroxyalkyl or carboxyalkyl modified cellulose suspending agent and is then halted at or near its completion; unreacted vinyl chloride monomer is removed, the suspension of polyvinyl chloride particles is cooled, a minor proportion of an acrylate ester monomer, e.g., methyl methacrylate, is then added with a fresh supply of a free radical initiating catalyst to the cooled suspension, the cooling being sufficient to retard polymerization of the acrylate, and polymerization is then resumed by heating the suspension and continued until the acrylate ester monomer polymerizes in and/or on the particles of the previously polymerized polyvinyl chloride. The polyacrylate-modified PVC thereby recovered is an effective aid for processing conventional PVC, or it can be processed per se since it is suitable for calendering or extruding.

25 Claims, No Drawings

PROCESS FOR MAKING POLYVINYL CHLORIDE PROCESSING AID INVOLVING COOLING STEP IN ACRYLATE GRAFT POLYMERIZATION OF POLYVINYL CHLORIDE

BACKGROUND OF THE INVENTION

When converting PVC, i.e., polyvinyl chloride, the resin ordinarily undergoes a fluxing step after which it is processed ot its desired shape. It is, of course, necessary that the resin remains stable at the high temperatures which are encountered during these processing and fluxing procedures. Additionally, the resin must yield under stress, it must have adequate flow properties and it must lend itself to milling and extrusion. Since unmodified PVC does not always possess all of these properties, it has been necessary or desirable to add various processing aids to the resin. For instance, acrylic ester polymers in granular form are dry-mixed with the PVC resin and then milled on a calender or extruded. Alternatively, it is suggested by British patents Nos. 1,062,308 and 1,015,334 that the vinyl chloride may be polymerized in the presence of the pre-formed acrylic ester polymer or the acrylic ester monomer may be added to the polyvinyl chloride latex and polymerized in situ. The resulting product is an emulsion grade polyvinyl chloride blended with the polyacrylate ester modifier. Such modified polymers and processing aids permit faster calendering with improved gloss, better surface qualities on extrusion, freedom from plating and other benefits.

In assignee's copending related patent application Ser. No. 760,067 filed Sept. 16, 1968, now abandoned in favor of cointinuation-in-part application Ser. No. 43,568, filed June 4, 1970 and now abandoned in favor of continuation-in-part application Ser. No. 178,795, filed Sept. 8, 1971 and now abandoned in favor of continuation application Ser. No. 388,288 filed Aug. 14, 1973, there is disclosed a process for preparing processing aids for PVC by means of a process involving initiating the suspension polymerization of PVC, removing unreacted vinyl chloride monomer from the system after polymerization is at least 60% complete, introducing methyl methacrylate monomer into the system whereupon the polymerization is resumed and continued until the methyl methacrylate is polymerized.

However, since filing the latter patent application, it has been found that the products resulting from the polymerization process disclosed therein are somewhat deficient with respect to their melt flow properties, i.e., their fluidity characteristics, during subsequent processing operations such as molding.

Still another significant deficiency of the process disclosed in the above identified copending application is the absence of any means of controlling the size of the initially prepared PVC particles as well as of the particles of the polyacrylate-modified PVC derived therefrom. There was, moreover, no recognition given to the necessity for producing the desired processing aid in a certain particle size range. For example, if the processing aid particles are too large in size, their use in certain applications, such for example as in bottle blowing, will result in the preparation of products having a grain-like surface or so-called "applesauce" effect.

In assignee's previously mentioned copending related patent application, Ser. No. 178,795 which is a continuation-in-part of the previously discussed application, Ser. No. 760,067, there is disclosed a process for preparing processing aids for PVC by means of a process involving initiating the suspension polymerization of PVC in the presence of a suspendiing agent and a free radical initiating catalyst, removing unreacted vinyl chloride monomer from the system after polymerization is at least 60% complete, introducing into the system a chain transfer agent and a premix of methyl methacrylate monomer and additional free radical initiating catalyst whereupon the polymerization is resumed and continued until the methyl methacrylate is polymerized. Strict particle size control on the initial PVC polymer and on the ultimate process aid product have been found to be essential to providing an effective process aid. It was also found essential in that case to premix the methyl methacrylate with the free radical initiating catalyst prior to adding the same to the PVC suspension. Merely venting the reactor to remove unreacted vinyl chloride monomer and adding the methyl methacrylate and additional catalyst to the reactor would not provide the desired results. The previously prepared PVC particles tended to absorb the methyl methacrylate and the catalyst in a non-uniform manner.

While premixing of the methyl methacrylate and the free radical initiating catalyst avoided one problem in providing a uniform product, it created another problem regarding commercial utilization of the process. Methyl methacrylate polymerizes easily at low temperatures particularly in the presence of the free radical initiating catalyst. It was considered impractical to mix monomer and catalyst in a separate tank as there was too much danger that the monomer would polymerize in the premix tank tand thereby disrupt plant operations.

Previous experience indicated that in situ blending did not provide the results desired as outlined hereinbefore. Applicants attempted to alter the in situ system by cooling the suspension of PVC prior to the addition of the methyl methacrylate. This was partially effective. However, there was excessive resin buildup on the reactor walls and products could not be duplicated easily. The suspending agent utilized in this system was a coreaction between a methyl vinyl ether/maleic anhydride copolymer and a polyoxyethylene sorbitan monolaurate (polysorbate 20).

It has now been found that all these difficulties can be overcome by means of a process for producing polyacrylate-modified PVC processing aids which process is at all times fully reproducible with respect to the properties inherent in the products derived therefrom.

TECHNICAL DISCLOSURE OF THE INVENTION

In accordance with the present invention, PVC processing aids are prepared by the process which broadly comprises suspension polymerizing vinyl chloride under conditions whereby polyvinyl chloride is obtained in a certain particle size range by means of a conventional, free radical initiated, suspension polymerization at a controlled rate of agitation and in the presence of a specified concentration of an alkyl, hydroxyalkyl or carboxyalkyl cellulose suspending agent; removing unreacted vinyl chloride from the system after polymerization is at least 60% complete; cooling the system to a temperature below which substantial polymerization of a subsequently added methyl methacrylate monomer can be polymerized by a subsequently added free radical initiating catalyst; adding to the system an effective concentration of a chain transfer agent and a minor proportion, i.e., up to about 50% by total solids weight of an acrylate ester monomer comprising methyl methacrylate and up to about 25% by its weight of one or more optional comonomers, as hereinafter defined, and a fresh supply of an effective concentration of a monomer soluble, free radical catalyst; heating the system to polymerization temperature, and continuing the polymerization until the thus added methyl methacrylate, and any optional comonomers added therewith, are polymerized in and/or on the particles of the previously polymerized PVC; and, separating the polyacrylate-modified polyvinyl chloride thereby obtained. Apparently, the thus added acrylate ester monomer, i.e., the methyl methacrylate and any optional comonomers, are absorbed by and polymerized in and/or on the initially prepared polyvinyl chloride particles so as to thereby produce a polyacrylate-modified PVC resin which acts as an effective processing aid for blending with a polyvinyl chloride resin substrate or which can be processed per se without the addition of any other processing aid.

Moreover, it has been found that the utilization in the process of this invention of:

(1) The step of using as suspending agent a cellulose type suspending agent, and (2) the step of completely removing any unreacted vinyl chloride monomer and cooling the reaction mixture prior to introducing and initiating the polymerization of the MMA and any optional monomers, with fresh catalyst as well as (3) the use of a chain transfer agent during the polymerization of the MMA all combine to contribute towards the attainment of a polyacrylate-modified polyvinyl chloride processing aid for PVC characterized by its excellent melt flow properties. Thus, these excellent melt flow properties appear to be directly attributable to the fact that the moieties derived from the methyl methacrylate, and from any optional comonomers which may also be present in the system, can be consistently obtained by means of this process whereas such products cannot ordinarily be prepared under conditions where (1) the unreacted vinyl chloride is not removed from the system; (2) the MMA monomer and any optional monomers and the added catalyst are not mixed into the system under the temperature conditions which retard or substantially prevent polymerization of the MMA and any optional monomers; and ( 3) a chain transfer agent is not present in the system during the polymerization of the MMA and any optional comonomers.

Similarly, by controlling the rate of agitation and the concentration of the modified cellulose suspending agent that is present in the system during the initial polymerization of the PVC as well as during the subsequent polymerization of the acrylate ester monomer, it is now possible to readily control the size of the initially produced PVC particles, thereby greatly facilitating the absorption and the polymerization of the subsequently introduced MMA and any optional monomers. In the same manner, the size of the resulting polyacrylate-modified polyvinyl chloride particles is now readily maintained within the required limits so as to avoid producing them in too large a particle size thereby preventing "gell" or "fish-eye" or "grain-like" surface characteristics in the final PVC composition wherein these processing aid particles have been included.

According to the preferred embodiment of this invention, the acrylate ester monomer, i.e., the MMA and any optional monomers, is introduced into the system in a concentration of from about 20–100%, and preferably from about 25–66%, by weight, of the previously polymerized PVC. Thus, from about 10–60%, and preferably about 20–40%, by weight, of the resulting polyacrylate-modified polyvinyl chloride processing aid product will comprise moieties derived from the acrylate ester monomer, i.e., from the MMA and any optional monomers, while the polyvinyl chloride comprises from about 40 to 90%, and preferably about 60 to 80%, by weight of the total weight of this product. It is important that the acrylate ester monomer which is employed should consist primarily of from about 80 to 100%, by weight, of methyl methacrylate (MMA) but, as a minor monomer ingredient together with the MMA, it is preferred that up to about 20% of the total acrylate ester monomer weight, or 25%, by weight, of the MMA, should comprise of one or more optional monomers.

In other words, the polyacrylate ester moieties of the novel polyacrylate modified processing aids of this invention may comprise polymethyl methacrylate or, more preferably, copolymers of methyl methacrylate with up to about 20%, by weight, of at least one ethylenically unsaturated, i.e., vinyl, comonomer. And as previously noted, these polyacrylate ester moieties, which should preferably comprise a methyl methacrylate copolymer, are present in the process aid particles in a concentration of from about 10–60%, and preferably about 20–40%, as based on the weight of the polyvinyl chloride moiety of the process aid particles.

The vinyl comonomers which can be used together with methyl methacrylate, in forming the preferred polyacrylate ester moieties of these process aid particles may be selected from the group consisting of the $C_2$–$C_3$ alkyl methacrylates, e.g., ethyl, n-propyl and iso-propyl methacrylate; the glycidyl esters of acrylic and methacrylic acid, e.g., glycidyl methacrylate and glycidyl acrylate; and, preferably, the $C_1$–$C_{12}$ alkyl acrylates wherein the alkyl group may be straight or branched, e.g., methyl, ethyl, n-propyl, n-butyl, iso-butyl, tert-butyl, hexyl, 2-ethylhexyl, decyl and dodecyl acrylate; or mixtures of any two or more of the latter optional monomers. Especially preferred is the polyacrylate-modified PVC process aid wherein the respective particles comprise about 70%, by weight, of polyvinyl chloride and about 30%, by weight, of a polyacrylate ester moiety which comprises a copolymer containing about 86%, by weight, of methyl methacrylate and 14%, by weight, of n-butyl acrylate.

It has been found that by adding the polyacrylate-modified polyvinyl chloride aids thus obtained to polyvinyl chloride resins in a concentration of from about 1–10%, by weight of the total mixture, the resultant compositions are easier to process than unmodified polyvinyl chloride. For example, when studied in a Brabender plastograph, the resulting easier processing resins are characterized by shortened flux times and higher shear torques. The polyacrylate-modified PVC processing aids which contain the preferred proportions of about 20 to 40 parts by weight MMA (with or without another optional monomer) to about 80 to 60 parts of polyvinyl chloride offer a substantial advantage over processing aids which are largely derived from acrylic polymers.

The process of this invention comprises adding the appropriate amount of acrylate ester monomer, comprising methyl methacrylate with or without one or more optional comonomers, to a previously polymerized, aqueous suspension of polyvinyl chloride, particularly PVC obtained by means of a suspension polymerization process. In conducting such a suspension polymerization process for the preparation of PVC, the vinyl chloride monomer, or a mixture of vinyl chloride with a minor proportion of an appropriate comonomer such as vinyl acetate or a lower alkyl acrylate, is admixed with a concentration of from about 0.01 to 5.0%, as based on the weight of the total monomer mixture, of a modified cellulose suspending agent selected from the group consisting of alkyl, hydroxyalkyl or carboxyalkyl modified cellulose wherein the respective alkyl groups have from 1–4 carbon atoms. Representative examples of these materials are methyl cellulose, hydroxyethyl cellulose, hydroxypropyl cellulose, carboxymethyl cellulose, and the like. The preferred suspending agent is methyl cellulose. The use of the modified cellulose suspending agent has been found to be critical in the commerical operation of the process as it eliminates reactor fouling. Also, the modified cellulose suspending agent provides a cleaner reaction and better particle size control. Particle size control is critical to obtaining a product which is an effective processing aid. Also, and as has already been noted, the particle size of the resulting PVC particles has been found to be affected by the concentration of the suspending agent that is present in the system. Thus, it is necessary to utilize a concentration of the cellulose suspending agent which is within the above stated limits. For example, if the latter maximum limit for the concentration of the cellulose suspending agent is substantially, exceeded, the resulting PVC particles will be well below the required particle size range which, as will be further discussed hereinbelow, is in the range of from about 5 to 150 microns. Conversely, if the lower limit of this range is not met, the resulting PVC particles will be far too large.

In addition, a monomer soluble, free radical catalyst or initiator such, for example as 2,2'-azobisisobutyronitrile, lauroyl peroxide, benzoyl peroxide or isopropylperoxy discarbonate should be present in the system in a concentration of from about 0.01 to 3%, by weight, of the total monomer charge being utilized for the polymerization of the vinyl chloride or vinyl chloride copolymer.

Polymerization may then be initiated by heating the above described recipe at a temperature in the range of from about 20° to 90°C. and for a period of from about 3 to 15 hours with agitation being applied throughout the course of the reaction. As was discussed hereinabove, with respect to the concentration of the modified cellulose suspending agent, the rate at which agitation is applied during the polymerization of the vinyl chloride is still another significant process variable which affects the particle size of the resulting PVC particles. Thus, if insufficient agitation is applied, he PVC particles will be far too large.

As will be understood by those skilled in the art, the substantial number of variations in the size and configuration of the agitation apparatus and reaction vessels which can be utilized in polymerization processes makes it impossible to set forth a range for the rate of agitation that is required to be applied in conducting the polymerization of PVC as the first step in the process of this invention. Accordingly, the agitation rate to be applied under any specific reaction conditions will be largely dependent upon such factors as the concentration of the suspending agent that is present in the system as well as on the design of the particular agitator, e.g., the shape of its blades, and reaction vessel, e.g., the number and design of its baffles, which are being utilized. Thus, the skill of the practitioner in the art will readily enable him to make whatever adjustments may be necessary in order to prepare the resulting PVC particles so that they are all substantially within the above given particle size range of from about 5 to 150 mcirons, and, preferably, from about 25 to 80 microns.

The size of these PVC particles is a critical feature of the process of this invention. The reason is not entirely understood, but apparently th acrylate ester monomer, i.e., methyl methacrylate and any optional monomers, is somehow improperly absorbed by PVC particles which are substantially larger than the above stated maximum of 150 microns and it cannot, therefore, be effectively polymerized.

Similarly, as has already been noted, it is necessary that the particles size of the final product, i.e., of the polyacrylate-modified polyvinyl chloride processing aid, be within certain limits. Thus, it is necessary that they should range in size from a minimum of about 10 microns up to a maximum limit such that no more than about 15%, by weight, are larger than about 150 microns. A preferred range is from about 40 to 150 microns. Thus, if the particles of the processing aid are substantially smaller than the latter minimum size, it will be extremely difficult to isolate them with conventional plant equipment. Conversely, if the maximum limit for the size of these processing aid particles is substantially exceeded, gells, fish-eyes, and the above described applesauce effect will be imparted to the processed PVC compositions containing such oversized processing aid particles.

In order to be able to attain this desired particle size in the novel processing aids of this invention, it is necessary to utilize the step of cooling the reactor after venting and removing unreacted vinyl chloride monomer prior to adding the acrylate ester monomer, i.e., the MMA and any optional comonomers and the fresh catalyst to the previously prepared PVC in combination with using the modified cellulose suspending agent in preparing the PVC.

Polymerization of the subsequently added acrylate ester monomer is initiated by a standard monomer soluble, i.e., oil-soluble, free radcial initiating catalyst. Suitable catalysts include 2,2'-azobisisobutyronitrile, lauroyl peroxide, benzoyl peroxide, t-butyl peroxy pivalate and isopropylperoxy dicarbonate. The amount of catalyst used will be generally dependent on the conditions employed in the MMA polymerization. Generally, the catalyst is used in an amount of from 0.05 to about 5%, by weight, based on the total weight of the MMA and any comonomers added.

It is essential that the reactor be cooled prior to adding the MMA and the catalyst. The cooling can be accomplished by any known means to effect that end. Flowing cold water through the reactor jacket has been found to be generally effective.

The initial polymerization of the PVC is normally run at a temperature of from 55°C. to 80°C. and preferably 65°–75°C. Prior to the addition of the MMA, the reactor must be cooled below about 45°C. Temperatures of below 0°C. are to be avoided since the system is an aqueous system. Also, excessively lowering the temperature is impractical as a substantial amount of heat would have to be applied to raise the temperature in the reactor to the polymerization temperature of the MMA, i.e., above about 45°C. Preferred temperatures to be maintained during the cooled stage are between about 25°C. and 45°C.

The MMA and catalyst can be added to the cooled PVC suspension in any order though it is preferred to add the catalyst first and then the MMA and any optional comonomers. To insure thorough mixing of the MMA throughout the suspension of PVC, the addition is preferably conducted with agitation. Agitation is preferably maintained for about 5 to 30 and preferably 10 to 15 minutes after completion of the addition to insure good mixing. In a large reactor where heat-up is slow, sufficient agitation can be attained during heat-up.

Chain transfer agents sre also used during the polymerization of the MMA, and any optional monomers, in order to further control the melt flow properties of the resulting acrylate modified PVC processing aids. These chain transfer agents, can be selected from the group consisting of:

1. chlorinated aliphatic hydrocarbons such as carbon tetrachloride, chloroform, methylene chloride, butyl chloride, methyl chloroform, propylene chloride and trichloroethylene;

2. aromatic hydrocarbons such as toluene, xylene, mesitylene, cumene, ethyl benzene, t-butyl benzene and chlorobenzene;

3. aldehydes such as acetaldehyde, propionaldehyde, benzaldehyde and crotonaldehyde;

4. aliphatic and cyclic ketones such as methyl ethyl ketone, acetone, diethyl ketone, methyl isobutyl ketone and cyclohexanone;

5. cyclic ethers such as dioxane and tetrahydrofuran;

6. alkyl esters of aliphatic carboxylic acids such as methyl isobutyrate and ethyl acetate;

7. aliphatic alcohols such as sec-butyl alcohol, n-butyl alcohol, isobutyl alcohol and t-butyl alcohol;

8. aliphatic carboxylic acids such as acetic acid;

9. cyclic hydrocarbons such as methyl cyclohexane; and, most preferably 10. mono- di- and polymercaptans including mono-mercaptans such as methyl mercaptan; ethyl mercaptan; propyl mercaptan; n-butyl mercaptan; n- and t-butyl mercaptan; n- and t-phenyl mercaptan; hexyl mercaptan; n- and t-heptyl mercaptan; n- and t-octyl-mercaptan; n- and t-decyl mercaptan; n-dodecyl, i.e., lauryl, and t-dodecyl mercaptan; n- and t-tetradecyl mercaptan; n- and t-hexadecyl mercaptan; n- and t-octadecyl mercaptan; n- and t-eicosyl mercaptan; n- and t-pentacosyl mercaptan; n- and t-octacosyl mercaptan, n- and t-triconyl mercaptan and blends thereof. From this group of mono-mercaptans, it is preferred to use lauryl mercaptan.

Other operable monomercaptans include thiocetic acid; 1-mercapto-2-butanone; methyl mercaptoacetate; ethyl mercaptothioacetate; 1-mercapto-2-ethoxyethane; diethyl mercaptoethyl phosphorotrithioate; 2-mercaptoethyl acetamide; dimethyl aminomethyl mercaptan; cysteamine; mercaptomethylthiopropane; monomercaptocyclohexane; benzyl mercaptan; cystein; and mercaptoethanol.

Suitable dimercaptan chain transfer agents can be illustrated by ethanedithiol; 2,3 dimercaptopropanol; decanedithol-1,10 and the like.

Suiable polymercaptan chain transfer agents having more than 3 mercaptan groups per molecule can be illustrated by pentaerythritol tetra(7-mercaptoheptanoate); mercaptoacetic acid triglyceride; pentaerythritol tri(beta-mercaptopropionate); penta-erythritol tetra(-beta-mercaptopropionate); cellulose tri(alpha-mercaptoacetate); 1,2,3-propane-trithiol; 1,2,3,4-neopentane tetrathiol; 1,2,3,4,5,6-mercaptopoly(ethyleneoxy)ethyl(sorbitol); 1,1,1-trimethyl propane tri(alpha-mercaptoacetate); dipentaerythritol hexa(3-mercaptopropionate); 1,2,3-tris(alpha-mercaptoacetypropane; thiopentaerythritol tetra(alpha-mercaptoacetate); 1,6,10-trimercaptocyclododecane, 1,2,3,4,5,6-hexamercaptocyclohexane; N,N',N''N'''-tetra(2-mercaptoethyl)pyromellitamide; tri-(2-mercaptoethyl)nitrilotriacetate; pentaerythritol tri (alpha-mercaptoacetate); pentaerythritol tetra (alpha-mercaptoacetate); tri(p-mercaptomethylphenyl)methane; 2,2,7,7-tetrakis(mercaptomethyl)-4,5 dimercapto-octane; 5,5,5-tri(mercaptoethyl)phosphorotrithioate; xylitol penta(-beta-mercaptopropionate); and the like.

Illustrative of low molecular weight polymeric materials having at least 3 pendant mercaptan groups per molecule are homopolymers and copolymers of vinyl thiol, e.g., polyvinyl thiol. Other polymeric thiols, such as glycerol/ethylene glycol polyether polymercaptan can also be used as chain transfer agents in the process of this invention.

From the above group, optimum results are, however, obtained by the use of low molecular weight polymercaptans having from 3–5 mercaptan groups per molecule as illustrated by pentaerythritol tetrathioglycolate; pentaerythritol tetra(3-mercaptopropionate); trimethylolethane tri(3-mercaptopropionate); xylitol penta(beta-mercaptopropionate); trimethyloleth-ane trithioglycolate trimethylolpropane tri(3-mercaptopropionate); and; trimethylolpropane trithioglycolate. The use of the latter polymercaptans is preferred since they are most efficient with respect to the rate of polymerization which is attainable in the system wherein they are utilized.

With respect to the amount of chain transfer which is used in the process of this invention, this will largely be determined by the particular chain transfer agent that is selected. However, in most instances they may be utilized in a concentration of from about 0.025–7.5%, as based on the total weight of the acrylate ester monomer charge, i.e., on the total weight of the MMA and any of the above identified optional monomers present in the monomer system. In general, mercaptans, and particularly polymercaptans, are more efficient and may be used in concentrations at the lower end of the latter range whereas less efficient chain transfer agents, such as the aromatic hydrocarbons, will be used in concentrations at the upper end of this range.

By utilizing a chain transfer agent in the process of this invention it is possible to exercise a greater degree of control upon the molecular weight, i.e., to prevent the attainment of a molecular weight which is higher than the maximum value in the below stated range, of that portion of the final polymeric product which is derived from the MMA and any optional comonomers which may have been introduced together therewith. This, in turn, affects the molecular weight of the product as a whole. Thus, it may be here stated that the products resulting from the process of this invention should, preferably, have a molecular weight, as expressed in terms of their Relative Viscosity, as determined in a 1%, by weight, solution of the polymer in cyclohexanone at 25°C., of from about 1.50–2.80 and, preferably, from about 2.30–2.60. Thus, it has been found that those products having a Relative Viscosity within this range will display optimum melt flow characteristics. As is known to those skilled in the art, Relative Viscosity is calculated by the use of the following formula:

$$\text{Relative Viscosity} = \frac{T_1}{T_2} \text{ where}$$

$T_1$ = the time required for the passage of a standard volume of the polymer solution through an orifice in a viscometer and $T_2$ = the time required for the passage of a standard volume of the solvent through the orifice in the identical viscometer.

The polymerization of the acrylate ester monomer, i.e., of the MMA and of any optional comonomers which may have been inroduced into the system therewith, is conducted by heating the system, i.e., the selected chain transfer agent, the previously prepared PVC polymer and the mixture of the catalyst with the MMA and any optional comonomers, up to a temperature of from about 40° to 100°C. for a time sufficient to completely polymerize the MMA, and any optional comonomers, in and/or on the host PVC particles. It is to be pointed out that it is not ordinarily necessary to introduce any fresh suspending agent into the system since a sufficient quantity will already be present from the initial polymerization of the PVC.

The particular catalyst, temperature, reaction time, and other operating conditions chosen are, of course, interdependent and may be those ordinarily employed in the polymerization of MMA. Other variations in polymerization technique will suggest themselves to those skilled in the art.

The process of this invention is particularly satisfactory when conducted with polyvinyl chloride homopolymers as the initially prepared vinyl chloride host polymer. However, as has already been briefly noted, there can also be employed the usual copolymers of vinyl chloride with minor proportions of one or more ethylenically unsaturated, i.e., vinyl, comomoners provided that the resulting vinyl chloride copolymers are within the above specified particle size and Relative Viscosity ranges. Similarly, the processing aids obtained by this process are especially desirable for incorporation in a substrate which may be polyvinyl chloride or a copolymer of vinyl chloride with one or more ethylenically unsaturated comonomers. Thus, for example, they provide excellent results with vinyl chloride:vinyl acetate copolymer which, as is well known, are especially difficult to calender.

Illustrative of these vinyl comonomers which can be used in preparing either the vinyl chloride host polymer of the novel processing aid of this invention or the vinyl chloride polymer substrates with which these processing aids may subsequently be blended include alpha-olefins such as ethylene, propylene and butylene, vinyl esters of carboxylic acids such as vinyl acetate, vinyl propionate, vinyl butyrate, and vinyl stearate; $C_1$–$C_{20}$ alkyl esters of acrylic and methacrylic acid such as methyl methacrylate, methyl acrylate, ethyl acelylate, butyl acrylate, 2-ethylhexyl acrylate and lauryl acrylate, aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and mono-diethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene, and, glycidyl esters of acrylic and methacrylic acid such as glycidyl acrylate and glycidyl methacrylate, etc.

It is essential, in this process, that the PVC, or vinyl chloride copolymer, be first polymerized by the suspension technique until the reaction is at least 60% complete and preferably 80% or more complete. Unreacted vinyl chloride must then be removed when the system is vented before the MMA and any optional comonomers are subsequently added and polymerized. If this is not done, the remaining vinyl chloride monomer will undergo an undesirable copolymerization with the subsequently added MMA leading to non-reproducible results and to the preparation of a soft, rubbery product which often hardens before it can be removed from the reactor. This feature of sequential polymerization, i.e., of first polymerizing the vinyl chloride and then the MMA, is a unique and important aspect of this invention.

The acrylate ester polymerization, i.e., the polymerization of the MMA with or without one or more optional monomers, is carried out in the same vessel immediately after the initial vinyl chloride suspension polymerization has been completed. The acrylate ester monomer polymerization is carried out in situ as soon as the original PVC polymerization system has been vented removing unreacted monomer and after the reaction mixture has been cooled. The MMA and any optional comonomers are introduced therewith, generally after having been thoroughly premixed though mixing of the MMA and any optional monomers can be accomplished in the polymerization vessel.

The compositions resulting from the admixture of PVC or of a vinyl chloride copolymer substrate, with the polyacrylate-modified polyvinyl chloride processing aids of this invention can also include various optional additives or adjuncts which may include, for example:

Plasticizers such as the alkyl esters of phthalic, adipic and sebacic acids and aryl phosphate esters such, for example, as dioctyl phthalate, ditridecyl phthalate and tricresyl phosphate, etc.

Lubricants such as stearic acid and its barium calcium and lead, salts, petroleum or paraffin based waxes, oils, low molecular weight polyethylene waxes, stearamides, montan wax, modified montan wax, synthetic waxes and stearic acid esters such as glyceryl monostearate, etc.

Pigments such as calcium carbonates, titanium dioxide, whiting, carbon black or any of the other pigments normally used in the processing of plastics.

Stabilizers which will protect the final formed product from the degradative effects of heat and light and which include phenyl salicylates; benzophenones; benzotriazoles, basic lead compounds such as dibasic lead phosphate, dibasic lead stearate, lead sulfate, lead chlorosilicate and dibasic lead phthalate; organo tin compounds such as dibutyl tin maleate, dibutyltin dilaurate, di(N-octh) tin maleate polymer, n-butyl stannoic acid, thiollauric acids or its anhydride, dibutyltin lauryl mercaptide, dibutyltin isoctyl thioglycollate, dibutyltin mercaptopropionate and di(n-octyl) tin S.S' bis(isoctylmercaptoacetate); organic acid salts of barium, cadmium calcium or zinc such as barium 2-ethylhexoate barium nonylphenate, cadmium 2-ethylhexoate, zinc 2-ethylhexoate and the laurates and stearates of barium, cadmium, calcium or zinc; polyols such as pentaerythritol and sorbital; nitrogen compounds such as melamine, benzoguanamine and dicyandiamide; epoxies such as epoxidized soya oil, epoxidized linseed oil, epoxidized tall oil esters and butyl and octyl epoxy stearate; organic phosphites such as diphenyldecyl phosphite, phenyl didecyl phosphate and trisnonylphenyl phosphite; and, liquid phenolics such as butylated hydroxytoluene, etc. For a more complete listing of plasticizers, lubricants, stabilizers and other functional additives, one may consult "Polyvinyl Chloride" by H. A. Sarvetnick published by Van Nostrand Reinhold Co., New York, N.Y. in 1969.

The compositions resulting from the admixture of PVC, or of a vinyl copolymer with the polyacrylate-modified PVC processing aids of this invention may be utilized in any of the coating, impregnating and molding applications known to those skilled in the art. For example, these compositions may be used for preparing such diverse items as pipes, rods, tubes, siding, molding and extruded solids, profiles, calendered films, blow molded bottles and other containers, extruded flat bed and blown films and in carrying out such processes as extrusion, calendering, compression molding, blow molding, injection molding, fluidized bed coating, electrostatic powder spraying and rotational casting or molding, etc.

The following examples are given to illustrate this invention but not in any way to limit its scope. In these examples, all parts given are by weight unless otherwise noted.

EXAMPLE 1

Part 1

A 10 gallon reactor was charged with the recipe, as given below, for preparing suspension grade polyvinyl chloride.

|  | Amount |
|---|---|
| Vinyl Chloride | 24 lbs. |
| Water | 58 lbs., 11 oz. |
| Methyl Cellulose | 20 grams |
| 2,2'azobisisobutyronitrile (catalyst) | 4 grams |

The methyl cellulose was dissolved in a portion of the water charge and then added to the reactor along with the remainder of the water. The catalyst was charged, reactor closed and then fully evacuated. The vacuum was held for 10 minutes, and broken with vinyl chloride monomer. The reactor was reevacuated and held under vacuum for 5 minutes before charging the vinyl chloride monomer. After turning the reactor agitator on to 351 RPM, the reactants were heated to 71°C. The reaction was held at 71°C. until a pressure drop of 20 PSIA was obtained. The reactor was cooled to 45°C. and vented.

Part 2

When the reaction of Part 1 was essentially complete, all excess vinyl chloride monomer was vented off, the agitator was stopped and 10 grams of 2,2'-azobisisobutyronitrile was added. The reactor was closed, vacuum stripped and held at maximum vacuum for 20 minutes. A solution of 7 lbs. 12 oz methyl methacrylate, 576 grams butyl acrylate and 0.6 grams of dodecylmercaptan was sucked into the reactor. The reactor was stirred for 10 minutes at 45°C. and then heated to 75°C. and held for 3 hours at 75°C. The reactor was cooled to room temperature, and the contents of the reactor were centrifuged, washed, and dried.

EXAMPLE 2

This example illustrates the use of the product of Example 1 hereinabove, in preparing a mixture with a PVC resin substrate which is then subjected to an extrusion operation.

In this procedure, 100 parts of suspension grade polyvinyl chloride resin granules are introduced into a Welex high speed, intensive mixer whose impeller speed is gradually increased up to 3,000 rpm which results in a temperature rise of about 3°-6°F. per minute within the resin mass. When the temperature of the resin is at about 140°F., 2.0 parts of an organo tin mercaptide stabilizer sold as "Thermolite 31" by M & T Chemicals, Inc. are added to the resin. Under continued agitation, the temperature of the mixture is raised to about 170°-175°F. at which point 2.0 parts of calcium stearate and 0.1 parts of low molecular weight polyethylene wax, sold by the Allied Chemical Co. as "PE-629 A" are added. Next, the temperature of the mixture is allowed to rise to about 215°F. whereupon 1.0 parts of titanium dioxide is added. Upon reducing the rate of agitation and applying external cooling, the temperature of the mixture is reduced to about 100° F. at which point 3.0 parts of the process aid particles whose preparation is described in Example 1, hereinabove, are introduced.

The resulting mixture is then blended, for 10 minutes, at a low rate of agitation and with external cooling whereupon it is removed from the mixer. It is then extruded in a 1 inch extruder fitted with a mutiple hole rod die with the extruder operating at 10–60 RPM at a stock temperature of about 390°–400°F. The result of this extrusion operation is a plurality of rod shaped products having a circular cross section with a diameter of one-sixteenth of an inch. Upon examining these rods, their surface is found to be exceedingly smooth and glossy with uniform cross-section indicating no surging of the material through the extruder.

What is claimed is:

1. In a process for the preparation of a polyacrylate-modified polyvinyl chloride processing aid which comprises: (1) first preparing particles of polyvinyl chloride in the 5–150 micron size range by suspension polymerizing vinyl chloride monomer in the presence of from about 0.01 to 5%, by weight, of the vinyl chloride monomer, of a suspending agent with agitation being applied to the system; (2) removing unreacted vinyl chloride monomer from the system after polymerization of the vinyl chloride is at least 60% complete; (3) adding to the suspension of polyvinyl chloride particles resulting from step (1) an effective concentration of (a) a chain transfer agent, (b) an acrylate ester monomer selected from the group consisting of methyl methacrylate and mixtures of methyl methacrylate together with from about 20 to 0%, by weight, of one or more ethylenically unsaturated comonomers and (c) an effective concentration of at least one free radical initiating catalyst which is soluble in said acrylate ester monomer; said acrylate ester monomer being added to the system in a total amount to provide between about 20– 100% of monomer, by weight of the polyvinyl chloride resulting from step (1); (4) suspension polymerizing the acrylate ester monomer in the presence of the mixture resulting from step (3) while applying agitation; and, (5) recovering the particles of polyacrylate-modified polyvinyl chloride resulting from step (4); said particles polyacrylate-modified polyvinyl chloride comprising of particles of polyvinyl chloride having polyacrylate ester moieties in and/or on said polyvinyl chloride particles, the improvements which comprise utilizing as said suspending agent in step (1) and alkyl, hydroxyalkyl or carboxyalkyl cellulose, and in step (3) cooling said suspension of polyvinyl chloride particles to a temperature below which substantial polymerization of said acrylate ester monomer can be initiated by said free radical initiating catalyst prior to adding said acrylate ester monomer and said free radical initiating catalyst to said suspension of polyvinyl chloride particle, followed by adding said acrylate ester monomer and said catalyst separately to said suspension, followed by heating said suspension to a temperature above at least 45°C. to initiate polymerization of said acrylate ester monomer.

2. The process of claim 1 wherein said ethylenically unsaturated monomer which is introduced into the system in step (3) along with said methyl methacrylate, is selected from the group consisting of the $C_2-C_3$ alkyl methacrylates, the $C_1-C_{12}$ alkyl acrylates, the glycidyl esters of acrylic and methacrylic acid and mixtures of the latter monomers.

3. The process of claim 1, wherein the proportion of acrylate ester monomer which is introduced into the system in step (3) is from about 35–65%, by weight, of the polyvinyl chloride resulting from step (1).

4. The process of claim 1, wherein the acrylate ester monomer which is introduced into the system in step (3) comprises methyl methacrylate.

5. The process of claim 1, wherein the remaining vinyl chloride monomer is removed in step (2) after polymerization of the vinyl chloride in step (1) is about 80% complete.

6. The process of claim 1, wherein said chain transfer agent is selected from the group consisting of chlorinated aliphatic hydrocarbons; aromatic hydrocarbons; aldehydes; aliphatic and cyclic ketones; cyclic ethers; alkyl esters of aliphatic carboxylic acids; aliphatic alcohols; aliphatic carboxylic acids; cyclic hydrocarbons; mono- di- and polymercaptans; and mixtures thereof.

7. The process of claim 6 wherein said chain transfer agent is a mono-mercaptan.

8. The process of claim 7 wherein said chain transfer agent is lauryl mercaptan.

9. The process of claim 1 wherein the polyvinyl chloride resulting from step (1) has a particle size in the range of from about 25 to 80 microns.

10. The process of claim 1 wherein the particles of polyacrylate-modified polyvinyl chloride resulting from step (4) have a particle size in the range of from about 10 microns up to a maximum limit such that no more than about 15%, by weight, are larger than about 150 microns.

11. The process of claim 10, wherein the particles of said polyacrylate-modified polyvinyl chloride processing aid resulting from step (4) have a particle size in the range of from about 40 to 150 microns.

12. The process of claim 1 wherein the polyacrylate-modified polyvinyl chloride processing aid resulting from step (4) has a Relative Viscosity of from about 1.50–2.80 when determined, at 25°C., with a 1% solution of the polymer in cyclohexanone.

13. The process of claim 1 wherein the acrylate ester monomer which is introduced into the system in step (3) comprises a mixture of methyl methacrylate and a $C_1-C_{12}$ alkyl acrylate.

14. The process of claim 13 wherein said $C_1-C_{12}$ alkyl acrylate comprises n-butyl acrylate.

15. The process of claim 14 wherein the acrylate ester monomer which is added to the system in step (3) comprises a mixture of about 84%, by weight, of methyl methacrylate and about 16%, by weight, of n-butyl acrylate.

16. The process of claim 1 wherein said particles resulting from step (4) comprise about 70%, by weight, of polyvinyl chloride and about 30%, by weight, of polyacrylate ester moieties which comprise a copolymer of about 84%, by weight, of methyl methacrylate and about 16%, by weight, of n-butyl acrylate.

17. The process of claim 1 wherein said suspending agent is selected from the group consisting of methyl cellulose, hydroxyethyl cellulose, hydroxypropyl cellulose, and carboxymethyl cellulose.

18. The process of claim 17 wherein said suspending agent is methyl cellulose.

19. The process of claim 1 where step (3) is conducted by cooling said suspension below a temperature of 45°C. and above a temperature of 0°C.

20. The process of claim 19 wherein said cooling temperature is below 45°C. and above 25°C.

21. The process of claim 1 wherein said free radical initiating agent is added first to said suspension after cooling followed by the subsequent addition of said methyl methacrylate.

22. The process of claim 1 wherein said suspending agent is methyl cellulose, said suspension is cooled to below 45°C. and above 25°C., and said free radical initiating catalyst is first added to said suspension of polyvinyl chloride particles after cooling followed by the subsequent addition of said methyl methacrylate.

23. The product resulting from the process of claim 1.

24. The product resulting from the process of claim 16.

25. The product resulting from the process of claim 21.

* * * * *